United States Patent [19]

Yoshioka et al.

[11] Patent Number: 5,415,836

[45] Date of Patent: May 16, 1995

[54] ANTIFOULING STRUCTURE AND METHOD

[75] Inventors: Toshio Yoshioka; Tatsumi Hayakawa; Kiichi Yamamoto; Tsutomu Mitsui, all of Aichi, Japan

[73] Assignee: NGK Insulators, Ltd., Nagoya, Japan

[21] Appl. No.: 196,784

[22] Filed: Feb. 15, 1994

Related U.S. Application Data

[63] Continuation of Ser. No. 864,553, Apr. 7, 1992, abandoned.

[51] Int. Cl.⁶ ............................................. B08B 17/00
[52] U.S. Cl. .......................................... 422/6; 422/19; 420/401; 420/494
[58] Field of Search ...................... 422/6, 19; 420/401, 420/485, 490, 494, 496

[56] References Cited

U.S. PATENT DOCUMENTS

| | | | |
|---|---|---|---|
| 2,139,497 | 4/1937 | Hensel et al. | 420/490 |
| 2,422,477 | 11/1944 | Driver | 420/494 |
| 3,103,103 | 9/1963 | Liddell | 422/6 |
| 3,395,530 | 8/1968 | Campbell . | |
| 4,042,402 | 8/1977 | Drake et al. . | |
| 4,202,858 | 5/1980 | Bruce et al. | 422/6 |
| 4,551,187 | 11/1985 | Church et al. | 420/494 |

FOREIGN PATENT DOCUMENTS

| | | |
|---|---|---|
| 1445157 | 5/1966 | France . |
| 2256072 | 7/1975 | France . |
| 2297195 | 8/1976 | France . |
| 8801284 | 2/1988 | WIPO . |

OTHER PUBLICATIONS

Canadian Copper, No. 126, W. R. Hemphill, "Zebra Mussels–An Update".
Annual Report, ICA Project No. 460, Feb. 1992, Spelt et al., University of Toronto, Department of Mechanical Engineering.

*Primary Examiner*—Timothy M. McMahon
*Attorney, Agent, or Firm*—Adduci, Mastriani, Schaumberg & Schill

[57] ABSTRACT

An antifouling structure in contact with seawater or at least its surface layer is made up of a beryllium copper alloy having a beryllium content lying in the range of 0.2% by weight to 2.8% by weight. While this antifouling structure is immersed in seawater, a beryllium or copper oxide film is formed on the surface layer of the beryllium copper alloy mother material and beryllium or copper ions are liberated from the exposed surface layer of the beryllium copper alloy mother material into seawater. As years go by, the beryllium or copper oxide film peels away from the beryllium copper alloy mother material. Due to indeterminate repetition of such peeling, the liberation of beryllium or copper ions from the exposed surface layer of the beryllium copper alloy mother material into seawater is sustained.

10 Claims, 2 Drawing Sheets

ANTIFOULING STRUCTURE AND METHOD

This application is a continuation of application Ser. No. 07/864,553 filed Apr. 7, 1992, (now abandoned).

BACKGROUND OF THE INVENTION

The present invention relates to an antifouling structure effective to prevent contamination by such oceanic contaminants as barnacles, blue mussel and seaweeds and an antifouling method of protecting a certain structure against contamination.

Offshore structures in contact with seawater are always exposed to contamination by oceanic contaminants, resulting in appearance damage or malfunction. For instance, ships suffer a driving force drop when many forms of oceanic contaminants are deposited onto their bottoms, etc, and thermoelectric power plants are forced to stop operation when various forms of oceanic contaminants are built up on their seawater intake pits, because a serious problem arises in connection with the circulation of seawater serving as a cooling medium.

Among scores of techniques for preventing deposition of oceanic contaminants studied so far in the art, there is now available a method of protecting an offshore structure against contamination, in which the surface of that structure in contact with seawater is coated with a coating material containing cuprous oxide or organotin.

A grave problem with this conventional method, however, is that the coating material has a service life of as short as one year, since even when applied in the form of a thick layer, it is likely to peel away; there is needed troublesome maintenance work in which the coating material must be renewed per year.

The use of the organotin-containing coating material, because of its toxicity and its risk of being accumulated in fishery products, is undesired in view of preservation of the environment. In recent years, 10% nickel-90% cupronickel has been practically used, but this is far from the above-mentioned coating material in terms of antifouling effect, although excelling in serviceability.

A main object of this invention is to provide an antifouling structure which is free from the abovementioned problems or, in other words, is well protected against contamination and serves well over an extended period of time with neither need of any maintenance nor a risk of posing any toxicity problem. Another object of this invention is to provide a method of protecting a structure against contamination.

SUMMARY OF THE INVENTION

According to one aspect of this invention, there is provided an antifouling structure characterized in that it is made up of a beryllium-copper alloy. Preferably, this beryllium alloy has a beryllium content lying in the range of 0.2 to 2.8% by weight.

According to another aspect of this invention, there is provided an antifouling offshore structure which is used on or in a place where it comes into contact with seawater, characterized in that at least its surface layer is made up of a beryllium-copper alloy having a beryllium—Be— content lying in the range of 0.2 to 2.8% by weight.

Preferably, the contents of cobalt, nickel and silicon selectively contained in said beryllium-copper alloy lie in the ranges of:

0.2 to 2.7% by weight for cobalt—Co,
1.4 to 2.2% by weight for nickel—Ni, and
0.2 to 0.35% by weight for silicon—Si.

Set out below are what purpose the above elements are added for and why the upper and lower limits thereof are set at the above values.

Beryllium—Be: 0.2–2.8% by weight

Be is used to (1) protect the structure immersed in seawater against contamination by liberating beryllium ions, (2) improve the strength and properties, e.g., corrosion resistance, of the beryllium-copper alloy, (3) enhance the productivity of the beryllium-copper alloy by heat treatment and grain size regulation, and (4) improve the processability and castability of the beryllium-copper alloy. At below 0.2% by weight the above-described effects (1)-(4) are unachievable. At higher than 2.8% by weight, not only is there a drop of metalleability but a cost-effective problem arises as well.

Cobalt—Co: 0.2–2.7% by weight

Co is used to form a fine CoBe compound and disperse it throughout the alloy matrix thereby improving the mechanical properties and productivity of the beryllium-copper alloy by heat treatment and grain size regulation. At less than 2.7% by weight, not only is there a drop of material flowability but there is no substantial improvement in the above-described effect as well. In addition, a cost-effective problem arises.

Nickel—Ni: 1.4–2.2% by weight

Ni is used to form a fine NiBe compound and disperse it throughout the alloy matrix thereby improving the mechanical properties and productivity of the beryllium-copper alloy by heat treatment and grain size regulation. At less than 1.4% by weight, this effect is not well achievable. At higher than 2.2% by weight, not only is there a drop of material flowability but there is no substantial improvement in the above-described effect as well. In addition, a cost-effective problem arises.

Silicon—Si: 0.2–0.35% by weight

Si is used to improve the material flowability of the beryllium-copper alloy. At less than 0.2% by weight, this effect is not well achievable. At higher than 0.35% by weight, the resulting alloy becomes brittle with a drop of toughness.

The composition of the beryllium-copper alloy forming the above-mentioned antifouling structure, for instance, may be:

(1) 0.2 to 1.0% by weight of Be and 2.4 to 2.7% by weight of Co with the balance being Cu and inevitable impurities;

(2) 0.2 to 1.0% by weight of Be and 1.4 to 2.2% by weight of Ni with the balance being Cu and inevitable impurities;

(3) 1.0 to 2.0% by weight of Be and 0.2 to 0.6% by weight of Co with the balance being Cu and inevitable impurities; and (4) 1.6 to 2.8% by weight of Be, 0.4 to 1.0% by weight of Co and 0.2 to 0.35% by weight of Si with the balance being Cu and inevitable impurities.

According to the third aspect of this invention, there is provided a method of protecting a structure against contamination characterized by comprising two stages or, to be specific, a first stage of forming an oxide film of beryllium or copper on the surface layer of a beryllium-copper alloy mother material which comes into contact with seawater and liberating beryllium or copper ions from the exposed surface layer of the beryllium-copper alloy mother material into seawater and a second stage of allowing said oxide film of beryllium or copper to peel away from the beryllium-copper alloy mother material, wherein said first and second stages are repeated, thereby ensuring a sustained liberation of beryllium or copper ions from the exposed surface layer of the beryllium-copper alloy mother material into seawater.

BRIEF DESCRIPTION OF THE DRAWINGS

This invention will now be explained more specifically, but not exclusively, with reference to the accompanying drawings, in which.

DETAILED DESCRIPTION OF THE INVENTION

Hitherto, copper has been known to protect structures against contamination, and this is considered due to the fact that oceanic life detests copper ions. However, a mere application of copper to offshore structures is found to fail to provide a practically sufficient antifouling effect.

As a result of the inventor's years of study, it has now turned out that a beryllium-copper alloy has a much more improved effect on protecting an offshore structure against contamination, as will be understood from the examples to be given later. The reason would be that beryllium and copper ions interact synergistically, producing a great effect on inhibiting oceanic life from having access to the offshore structure and preventing the propagation of oceanic life.

In other words, the beryllium-copper alloy has a combined effect both on preventing contamination and on the sustained liberation of copper ions. Detailed reference will now be made to the antifouling effect and the sustained action on liberating copper ions.

(1) Antifouling Effect

As well known from literature, the order of ionization tendency among beryllium, copper and nickel is expressed by

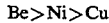

Figure 1:
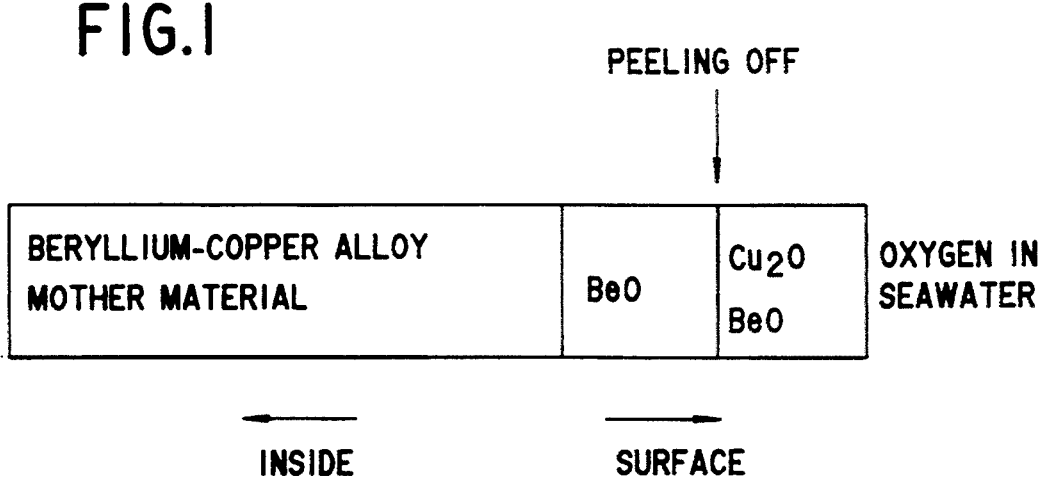
FIG. 1 is a sketch showing an oxide film of one example of the beryllium-copper alloy according to this invention.

In other words, beryllium ions are more likely to be liberated than nickle ions, and copper ions are less likely to be liberated than nickel ions. In the case of a beryllium/copper combination, beryllium is first ionized to form a local cell, which has an effect on preventing the deposition of oceanic contaminants due to its current effect, while beryllium ions take on the form of internal oxidation. By this internal oxidation, a BeO film is first formed, as typically shown in FIG. 1. This BeO film, because of being porous, allows copper ions to be liberated, forming a hybrid oxide $Cu_2+BePO$ on its surface. This liberation of copper ions into seawater produces an antifouling effect.

(2) Sustained Action on Liberating Copper Ions

The above-mentioned effect (1) on preventing contamination makes another contribution to providing a sustained liberation of copper ions; that is, the beryllium copper enables an antifouling function to be sustained ceaselessly. While in contact with seawater, the beryllium copper forms on its surface an intimate surface oxide ($Cu_2O$), just below which a porous oxide film of BeO is formed, as can be seen from FIG. 1. Thus, the liberation of copper ions into seawater is maintained, while this film increases in volume by oxidation. When this volume increase reaches a certain level, the surface oxide film peels away from the porous oxide or BeO layer. This would enable electrochemical action and the liberation of copper ions to be maintained over an extended period of time.

Figure 3:
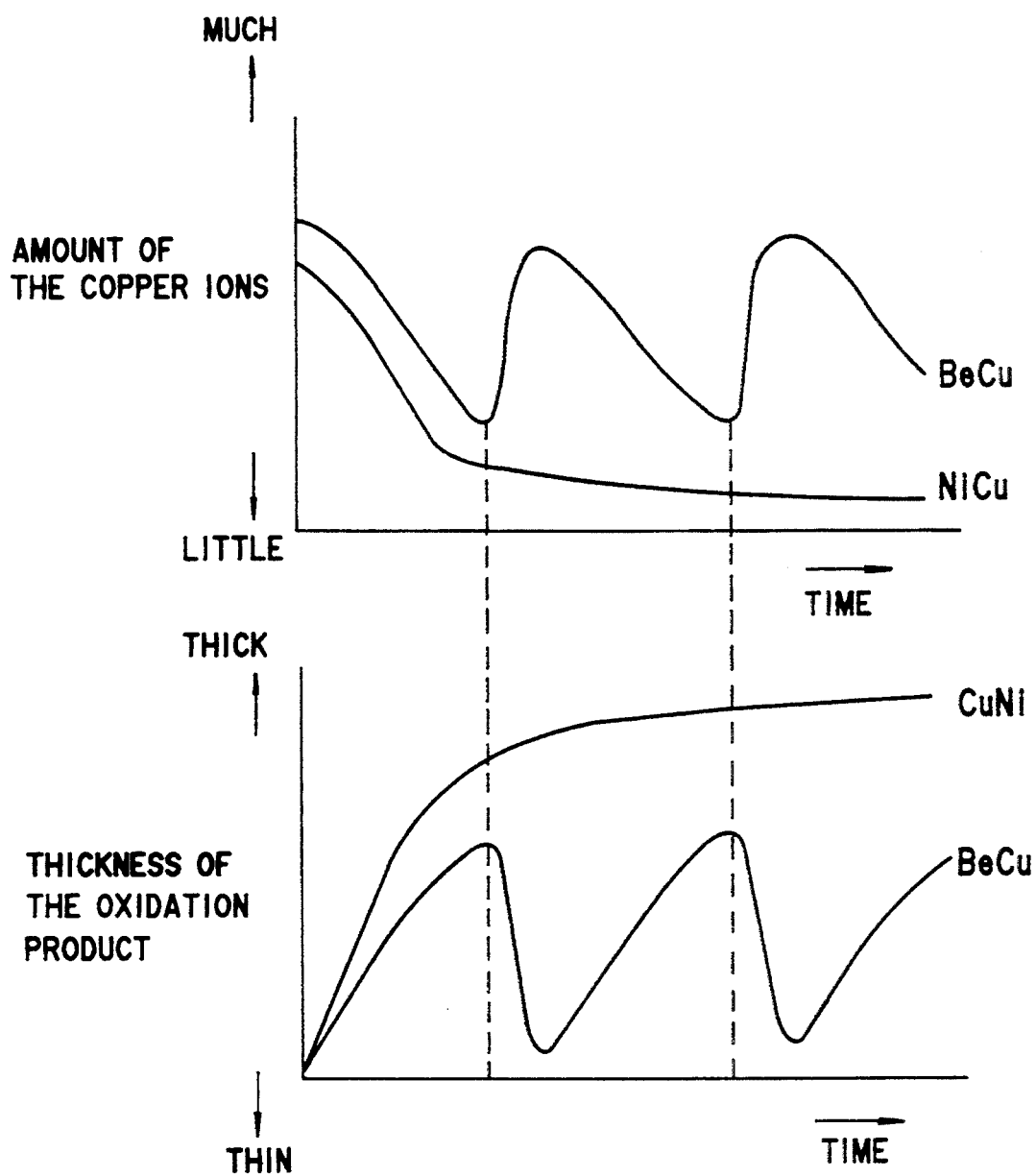
FIG. 3 is a graph showing an amount change-with-time of copper ions liberated from beryllium-copper and cupronickel and a graph showing a thickness change-with-time of corroded matter deposited when beryllium-copper and cupronickel were used.

With reference to FIG. 3 which shows graphical views in which the beryllium copper is compared with cupronickel, the sustained action the beryllium copper has on the liberation of copper ions may be explained as follows.

When the corrosion (oxidation) product reaches a certain thickness, it peels away from the beryllium copper-BeCu, as can be seen from FIG. 3. Then, the beryllium-copper alloy is again exposed on its surface to seawater and corroded or oxidized to grow an oxide film. When this film grows to a certain thickness level, it peels away from the beryllium copper. This process is repeated over and over. The liberation of copper ions, on the other hand, is likely to be reduced with an increase in the thickness of the oxidation product. As the oxidation product peels away, however, the beryllium-copper alloy is again exposed on its surface to seawater, so that there can be an increase in the amount of the copper ions liberated. Thus, the increase and decrease in the amount of the copper ions liberated occur alternately.

The beryllium-copper alloy according to this invention enables copper ions to be continuously liberated by the peeling-off of the oxide film. As a result, no or little contaminants are deposited onto the surface of the beryllium-copper alloy.

Figure 2:
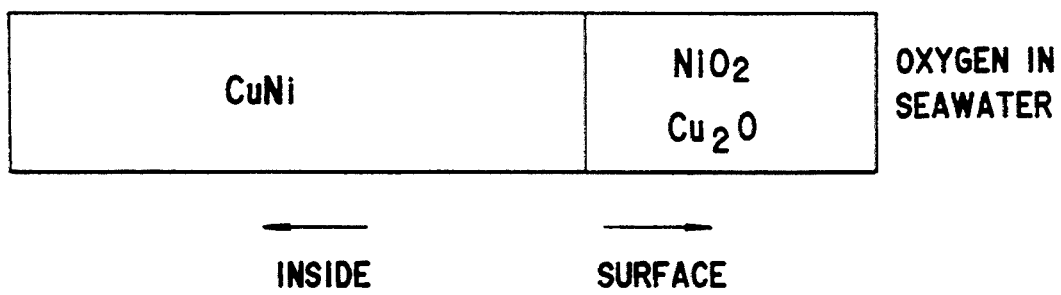
FIG. 2 is a sketch showing an oxide film of cupronickel for the purpose of comparison.

This is in contrast to the comparative cupronickel-CuNi, as can be seen from FIG. 2. As years go by, an intimate nickel oxide ($NiO_2$) or copper oxide ($Cu_2$) layer is formed on the surface of the cupronickel, reducing the liberation of copper ions, as can be seen from FIG. 2. According to the order of ionization tendency (Be>Ni>Cu), this would be due to the fact that nickel (Ni) is preferentially ionized to form a local cell and an intimate oxide is formed on the surface of the cupronickel, as can be seen from FIG. 2. As can be understood from FIG. 3, the thickness of the corrosion product on the cupronickel increases initially with the lapse of time, but its growth rate decreases as time goes by. With this, there is a decrease in the amount of the copper ions liberated. In addition, the corrosion product is less likely to peel away from the cupronickel than from the beryllium copper. Thus, the quantity of the copper ions liberated remains low, resulting in a drop of the antifouling effect.

It is to be noted that the facts that a beryllium-copper alloy has a remarkable antifouling effect and provides a continuous liberation of copper ions have been discovered by the inventors for the first time. Insofar as the inventors are concerned, never until now have such facts been referred to or indicated in literature.

For practical beryllium alloys, various alloys inclusive of 11 Alloy having a beryllium content of 0.2 to 0.6% by weight and 25 Alloy having a beryllium content of 1.8 to 2.0% by weight are now known in the art. In view of the antifouling effect, however, a beryllium content of at least 1.6% by weight is preferred. At a beryllium content higher than 2.8% by weight, beryllium does not form a solid solution with copper; that is, the resulting alloy excels in the antifouling effect but becomes inferior in metalleability. Thus, if beryllium-copper alloys have a higher beryllium content, it is then preferred that they be produced by casting.

It has also been confirmed that not only does a beryllium alloy pose no toxicity problem at all, but its service life in seawater is as long as that of aluminium pitch copper or white brass.

Besides being in a sheet or tube form, the antifouling structure of this invention may be obtained by casting in various desired forms and so may be variously formed depending upon what purpose it is used for. In addition, the antifouling structure of this invention may be entirely or partly made up of a beryllium-copper alloy. In the latter case, use may be made of a clad material, only the part thereof to come in contact with seawater being made up of a beryllium-copper alloy.

In the ensuing description, this invention will now be explained at great length with reference to the examples.

EXAMPLES 1

Each of test sample Nos.1–9 set out in Table 1 was formed into a sheet of about 0.1 to 0.5 mm in thickness, which was then dipped in seawater. For the purpose of comparison, iron sheets coated on their surfaces with a conventional antifouling coating material—test sample Nos. 10 and 11—were likewise immersed in seawater.

One year later, estimation was made of in what conditions shellfish and seaweeds were deposited onto the surfaces of the test samples. Estimation Criteria:
- ⊙: little deposition found
- ○: limited deposition found
- ●: normal deposition found
- Δ: increased deposition found
- ×: more increased deposition found In what conditions the test samples were corroded was estimated by five criteria as well. The durability of control test sample Nos. 10 and 11 was estimated by observing the state of the coating material thereon.

In addition, the metalleability, castability and toxicity of the test samples were estimated. The results are reported in Table 1 with the results of all-round estimation.

TABLE 1

| No | Material | AF(S) | AF(SW) | SA | TX | MA | CA | ARE |
|---|---|---|---|---|---|---|---|---|
| 1 | Be—Cu 11 Alloy 0.2–0.6% Be | ○ | ⊙ | ⊙ | not found | ⊙ | — | ○ |
| 2 | Be—Cu 165 Alloy 1.6–1.8% Be | ⊙ | ⊙ | ⊙ | not found | ⊙ | — | ⊙ |
| 3 | Be—Cu 25 Alloy 1.8–2.0% Be | ⊙ | ⊙ | ⊙ | not found | ⊙ | — | ⊙ |
| 4 | Be—Cu Alloy 0.1% Be | ○ | ○ | ○ | not found | ⊙ | — | ○ |
| 5 | Be—Cu Alloy 2.2% Be | ⊙ | ⊙ | ⊙ | not found | × | ⊙ | ○ |
| 6 | Be—Cu Alloy 2.75% Be | ⊙ | ⊙ | ⊙ | not found | × | ⊙ | ○ |
| 7 | Pure Copper | ○ | ○ | ○ | not found | ○ | — | ○ |
| 8 | Cupronickel 10% Ni | ○ | ● | ⊙ | not found | ⊙ | — | ● |
| 9 | Cupronickel 30% Ni | ○ | ● | ⊙ | not found | ⊙ | — | ● |
| 10 | Stainless Steel SUS | × | × | ● | not found | ⊙ | — | × |
| 11 | Fe + Cu₂O- cont. coating | ⊙ | ⊙ | × | not found | ⊙ | — | ○ |
| 12 | Fe + Organotin cont.coating | ⊙ | ⊙ | × | found | ⊙ | — | × |

In Table 1:
AF: Antifouling Effect
S: Shellfish
SW: Seaweeds
SA: Serviceability
TX: Toxicity
MA: Metalleability
CA: Castability
ARE: All-Round Estimation

| Marks | Antifouling Effect (Amount of Contaminants) | Serviceability | Processability | All-Round Estimation |
|---|---|---|---|---|
| ⊙ | very good | very good | very good | excellent |
| ○ | limited | good | good | good |
| ● | normal | normal | normal | normal |
| Δ | increased | bad | bad | bad |
| × | much increased | very bad | very bad | very bad |

EXAMPLE 2

A beryllium-copper alloy (165 Alloy) containing 1.6 to 1.8% by weight of beryllium was formed into a 0.1-mm thick sheet, which was then bonded to the surface of the outer plate of a fiber glass boat. Even in two or more years later, there was no noticeable deposition of oceanic life; that is, the boat could be used without washing at all.

EXAMPLE 3

A beryllium-copper alloy (25 Alloy) containing 1.8 to 2.0% by weight of beryllium was formed into a 0.5-mm thick sheet, which was then bonded to the concrete surface of the water intake pit in a thermoelectric power plant. Even in two or more years later, there was no noticeable deposition of oceanic life; that is, there was no need of washing the pit at all. It is noted that when concrete was unprotected, decontamination was needed every three months.

EXAMPLE 4

A high beryllium material was produced by casting. A pipe of 120 mm in outer diameter, 10 mm in thickness and 300 mm in length was immersed in seawater to observe a change in section over an extended period of time. The first pipe used was made of 2.2% by weight of Be and 0.72% by weight of Co, 0.29% by weight of Si with the balance being Cu and inevitable impurities, and the second pipe used of 2.7% by weight of Be, 0.80% by weight of Co and 0.28% by weight with the balance being Cu and inevitable impurities. In two years later, there was no noticeable deposition of oceanic life on each pipe.

As will be understood from what has been described, the present invention makes a breakthrough; that is, if applied to ships, it is then possible to reduce the driving energy and if applied to the water intake pit of a thermoelectric power plant, it can then be operated without interruption. As will be apparent to those skilled in the art, the present invention would make a lot of contribution to fostering industry. For instance, the antifouling structure and method of this invention could be applied to the outer panels of submarines and offshore power plants, net anchorages for fish preserves, rafts for ocean culture and the condensers or other equipment of thermoelectric power plants.

The antifouling structure and method of this invention as explained above have a number of advantages. Among them, it enables deposition of oceanic life to be prevented over an extended period of time; it serves well over an extended period of time with no need of maintenance; and it does not present any toxicity problem, thus making a contribution to preservation of the environment.

I claim:

1. An antifouling structure having resistance against deposition of oceanic contaminants when the structure is exposed to seawater, comprising:
   an offshore structure which contacts seawater and which is comprised of or has a surface layer comprised of a beryllium cooper alloy having a beryllium content in the range of 0.2% by weight to 2.0% by weight.

2. An antifouling structure as claimed in claim 1, wherein the beryllium cooper alloy has a nickel content lying in the range of 1.4% by weight to 2.2% by weight.

3. An antifouling structure as claimed in claim 1, wherein the offshore structure is a fiberglass boat.

4. An antifouling structure as claimed in claim 1, wherein the offshore structure is a concrete water intake pit for a thermoelectric power plant.

5. An antifouling structure as claimed in claim 1, wherein the beryllium copper alloy has a cobalt content lying in the range of 0.2% by weight to 2.7% by weight.

6. An antifouling structure as claimed in claim 5, wherein the beryllium copper alloy has a silicon content lying in the range of 0.2% by weight to 0.35% by weight.

7. An antifouling method of protecting an offshore structure from deposition of marine life when the offshore structure is exposed to seawater, the antifouling method comprising the steps of:
   providing an outer surface of the offshore structure with a base layer of a beryllium copper alloy material having a beryllium content in the range of 0.2% by weight to 2.0% by weight;
   contacting the structure with seawater;
   forming a porous oxide layer of BeO film on the base layer through internal oxidation of beryllium ions within the beryllium copper alloy material;
   forming a hybrid oxide surface layer by liberating copper ions of the beryllium copper alloy material through the porous oxide layer of BeO film; and
   liberating copper ions into the seawater to protect the offshore structure from deposition of marine life.

8. The antifouling method as claimed in claim 7, wherein said step of forming a porous oxide layer is performed in response to exposing the base layer of beryllium copper alloy material to seawater.

9. The antifouling method as claimed in claim 8, further comprising the step of allowing the porous oxide layer of beryllium oxide film to peel away from the base layer of beryllium copper alloy material, thereby allowing copper ions of the beryllium copper alloy material to be continuously liberated into the seawater.

10. A method of protecting an offshore structure from deposition of marine life when the offshore structure is exposed to seawater, said method comprising the steps of:
    forming a beryllium copper alloy having a beryllium content in the range of 0.2% by weight to 2.0% by weight into a structure to be contacted with seawater; and
    contacting the structure with seawater.

* * * * *